United States Patent
Slater et al.

(10) Patent No.: US 6,317,533 B1
(45) Date of Patent: Nov. 13, 2001

(54) FIBER OPTIC SWITCH CONFIGURATIONS

(75) Inventors: Joseph B. Slater; Eric Ferree, both of Dexter; Dane Barlow, Chelsea, all of MI (US)

(73) Assignee: Kaiser Optical Systems, Ann Arbor, MI (US)

( * ) Notice: Subject to any disclaimer, the term of this patent is extended or adjusted under 35 U.S.C. 154(b) by 0 days.

(21) Appl. No.: 09/441,684

(22) Filed: Nov. 16, 1999

Related U.S. Application Data

(60) Provisional application No. 60/108,719, filed on Nov. 17, 1998.

(51) Int. Cl.⁷ ............................... G02B 6/26; G02B 6/42
(52) U.S. Cl. ............................... 385/22; 385/16; 385/33; 385/73; 385/115
(58) Field of Search ........................ 385/22, 16, 24, 385/34, 33, 31, 115, 116, 38, 36, 51, 73

(56) References Cited

U.S. PATENT DOCUMENTS 5,165,104 * 11/1992 Weverka ........................ 385/14 X

* cited by examiner

*Primary Examiner*—Phan T. H. Palmer
(74) *Attorney, Agent, or Firm*—Gifford, Krass, Groh, Sprinkle, Anderson & Citkowski, PC

(57) ABSTRACT

In an improved optical switch, light from an input optical fiber is directed to one of a plurality of output optical fibers on a selective basis. The output fibers are contained in a bundle, preferably within a removable connector, thereby easing removal and maintenance. The input fiber also preferably forms pair of a bundle within a removable connector. The means for selectively directing the light from the end of the input fiber to the end of one of a plurality of the output fibers may include a pivot upon which at least the input optical fiber is mounted, or an electro-optic Bragg cell without moving parts. One or more lenses are preferably used between the end of the input optical fiber and the ends of the output fibers to assist in directing the light. A preferred arrangement incorporates two lenses, positioned so that the end of the output fiber and the end of a selected input fiber are each located at the focal point of one of the lenses.

29 Claims, 2 Drawing Sheets

FIBER OPTIC SWITCH CONFIGURATIONS

REFERENCE OF RELATED APPLICATION

This application claims priority from U.S. provisional application Ser. No. 60/108,719, filed Nov. 17, 1998, the entire contents of which are incorporated herein by reference.

FIELD OF THE INVENTION

This invention relates generally to optical switching and, in particular, to apparatus for selectively coupling the output of one fiber to the input of one of a plurality of other optical fibers.

BACKGROUND OF THE INVENTION

There is a growing need in communications and other applications for redirecting the light from an optical fiber into one or more other fibers on a selective basis. There are a number of commercially available devices which address this need. One of these devices, shown in FIG. 1, utilizes graded-index (GRIN) lenses to form a realignable image relay. Light from an input fiber 102 is collimated by a first GRIN lens 104, which is received by a GRIN lens 106 operative to focus the collimated beam onto an output fiber 108. The input lens 104 is then mechanically repositioned in alignment with other output lenses and fibers 106'–106''' and 108'–108''', respectively, to perform a sequential input-to-output switching function.

One problem associated with the arrangement just described is that each fiber must be held in place relative to its respective GRIN lens through bonding, for example, within an alignment tube. As such, an adhesive is often used between the fiber and the lens, which can degrade under high laser power, thereby adversely affecting performance. In some designs, adhesives are not used in the gap between a particular fiber and its associated GRIN lens, but outgassing from adhesives in close proximity may coat the optical surfaces, causing the same type of problem to occur.

Another existing approach involves alignment of the fiber end faces directly, without the use of bonded lenses. In this case, the fiber end faces are cleaved and polished, and brought to within a few microns and aligned center-to-center. The principle challenge with this approach is the extreme mechanical precision required in the alignment process, such that very small amounts of contamination between the fibers greatly affects performance. In addition, in both of the techniques just described, the fibers are integral to the switch, thereby making removal, reconfiguration and maintenance of the fibers difficult to achieve.

SUMMARY OF THE INVENTION

This invention resides in an improved optical switch of the type wherein the light from an input optical fiber is directed to one of a plurality of output optical fibers on a selective basis. In contrast to existing designs, at least the output fibers are contained in a bundle, preferably within a removable connector, thereby easing removal and maintenance. The input fiber also preferably forms part of a bundle within a removable connector.

Means are provided for selectively directing the light from the end of the input fiber to the end of one of a plurality of the output fibers. In one preferred embodiment, the means for selectively directing the light includes a pivot upon which at least the input optical fiber is mounted. According to an alternative embodiment, an acousto-optic Bragg cell is used for such purpose, thereby eliminating moving parts.

One or more lenses are used between the end of the input optical fiber and the ends of the output fibers to assist in directing the light. A preferred arrangement incorporates two lenses, positioned so that the end of the output fiber and the end of a selected input fiber are each located at the focal point of one of the lenses. When this arrangement is used with a pivoting bench, preferably both the input fiber and a first lens move as the light in directed from input to output.

DETAILED DESCRIPTION OF THE INVENTION

The present invention improves upon the prior art by providing fiber-optic switch configurations with reduced alignment problems and, in the preferred embodiments, utilizes optical connectors facilitating easier removal, replacement and maintenance of the optical fibers. In meeting these objectives, the invention preferably utilizes two multi-fiber connectors, one associated with light input, and the other associated with light output. Such an arrangement facilitates the rapid reconfiguration of the switch by simply disconnecting the input and output connectors. In the preferred embodiment, "MT"-style connectors are used.

Figure 1:
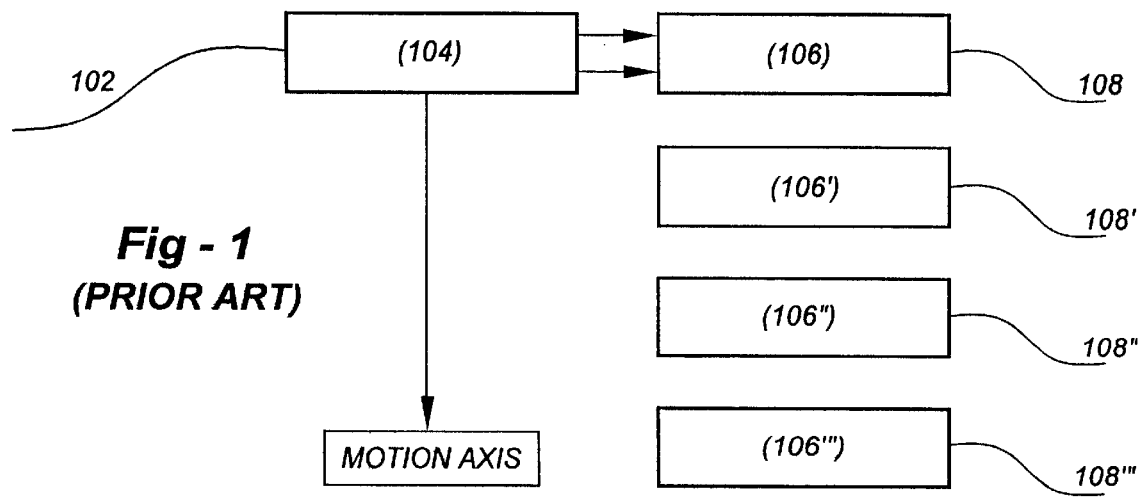
FIG. 1 is a simplified drawing which shows a prior-art switch operative to route the light from an input fiber to one of a plurality of output fibers on a sequential basis.
Figure 2A:
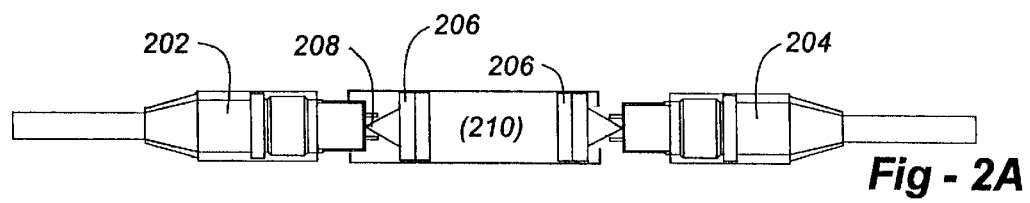
FIG. 2A is a top view of an embodiment of this invention wherein an input fiber contained in removable connector bundle and lens assembly are mounted on a pivoting optical bench.
Figure 2B:
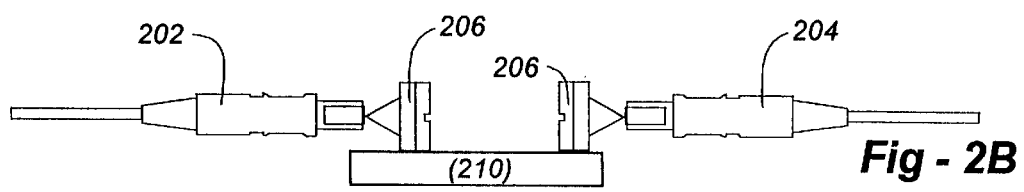
FIG. 2B is side view drawing of the arrangement of FIG. 2A.

FIG. 2 illustrates a first embodiment of the invention which constitutes a variant on the realignable image relay approach discussed with reference to the prior art of FIG. 1. Two multi-fiber connectors 202 and 204 are located at the focal points of two relay lenses 206, which may be of conventional design such as aspheres, spherical singlets, multi-element lenses, acromats, diffractive/reflective hybrids or GRIN lenses. The lenses 206 and the input connector 202 are attached to an optical bench 210 which is mounted on a pivot 208. The output connector 204 is stationary. Since the connectors typically include multiple fibers, not all of them are used. According to this invention, only a single fiber of the input connector 202 is used for light delivery, whereas at least a subset of the fibers in the output connector 204 are used for light reception and transfer.

To operate the switch, the bench 210 is rotated about the pivot 208, thus bringing the relayed image of the input fiber into a alignment with a desired output fiber on the stationary output connector 204. Preferably, the pivot is based upon a flexure-type bearing, thereby offering extreme stability and repeatability.

Figure 3:
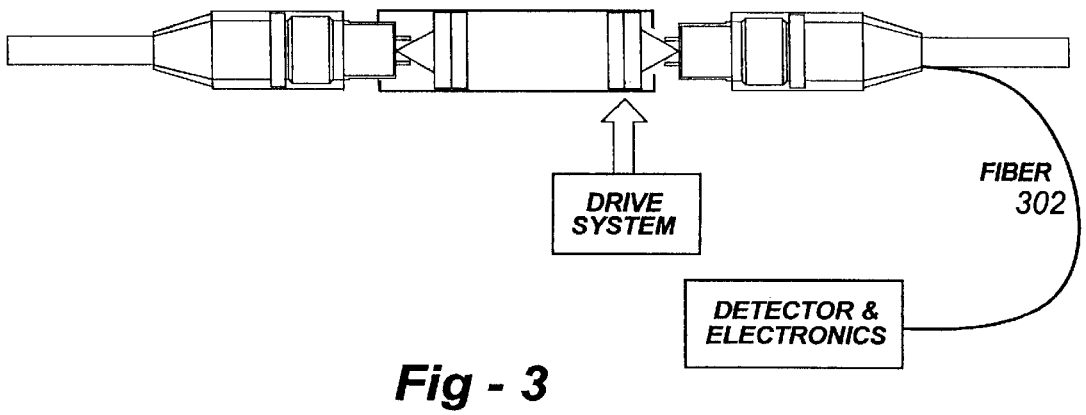
FIG. 3 is a drawing which illustrates how at least one of the fibers comprising the bundle in the output end of the apparatus may be used for alignment purposes.

Even with this mounting arrangement, however, one of the primary difficulties with this approach is establishing an accurate reference position. Since multi-fiber connectors such as MT connectors include a large number of optical fibers, unused fibers may conveniently be used to advantage, as shown in FIG. 3. In particular, an unused fiber 302 may be looped back and connected to a detector and electronics 306. As such, a "home position" may be established by driving the pivot to illuminate the extra fiber 302.

The drive system uses this reference position by moving back and forth, searching for the maximum amount of light from the extra fiber 202 as sensed by the detector and electronics 306. This may be carried out by finding the half-power points of the received light, and dividing by the difference. Once the home position is located, it may be then be used to reliably and repeatably relay the input to a plurality of output fibers in conjunction with normal operation. A distinct advantage of this arrangement is that the home position is established through the input fiber/connector of the actual switch, and not through a secondary reference. This compensates for any wear in the pivot or drive system, which may occur over time.

Figure 4:
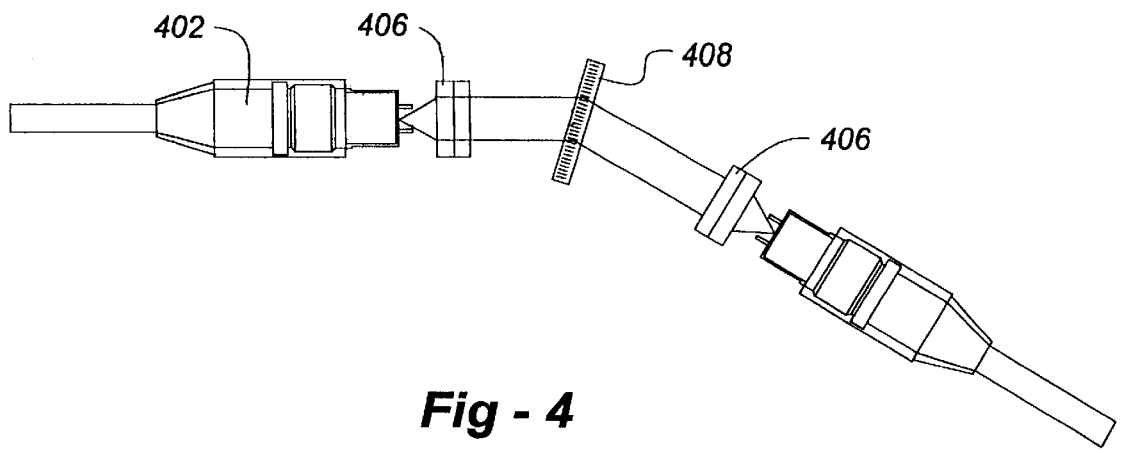
FIG. 4 is an alternative embodiment of the invention wherein an electro-optic Bragg cell is used for light beam routing without the need for any moving parts.

Turning now to FIG. 4, there is shown an alternative embodiment of the invention which utilizes no moving parts. As with the embodiments of FIGS. 2 and 3, multi-fiber connectors 402 and 404 are preferably used for light input and output, respectively. However, as opposed to mechanically aligning the relayed image, an acousto-optic Bragg cell 408 is used to diffract the beam to different output fibers within the connector 404 through lens 406. In this case, both the input and output fiber connectors, as well as the lenses, may be fixed in position. The Bragg cell varies the angle of diffraction based upon the frequency of the driving acoustic signal, thus steering the relayed image to different output fibers. As discussed above, this particular configuration affords the advantage of no moving parts.

Based upon the detailed description set forth above, one of skill in the art will recognize that certain variations, modifications and advantages of the invention are possible while keeping within the scope of the disclosure overall. As one variation, although, in the preferred embodiment, a multi-fiber connector is used for input purposes, since typically only one of the inputs fibers will be used for light delivery, a bonded fiber/lens combination of the type shown with numerical references 102 and 104 in FIG. 1 may alternatively be utilized. In addition, although two lenses are used in the space between the input and output fibers, fewer lenses may be used depending upon the spacing between the fibers, and other factors. Although an acousto-optic Bragg cell is shown in FIG. 4, it will be appreciated that any form of light redirecting device may alternatively be used, whether now existing or yet to be developed, so long as the light from at least one input fiber is selectively coupled to the ends of the output fibers, as described herein. In terms of advantages, it will be recognized that in contrast to the apparatus of FIG. 1 which is limited to sequential switching among fibers, due to the reduced range of motion or no moving parts required by the instant invention, random, as opposed to sequential, switching may be supported as well.

We claim:

1. An optical switch, comprising:
   an input optical fiber having a light output end;
   a bundle of output optical fibers, each having a light input end spaced apart from the light output end of the input fiber;
   one or more lenses supported in the space between the end of the input fiber and the ends of the output fibers; and
   a pivot upon which at least the input optical fiber is mounted for selectively directing the light from the end of the input fiber to the end of one of a plurality of the output fibers.

2. The optical switch of claim 1, wherein one or both of the input fibers and output bundles are contained in removable connectors.

3. The optical switch of claim 1, wherein at least one of the output optical fibers is routed to a detector to determine a home position.

4. The optical switch of claim 1, including two lenses positioned so that the end of the output fiber and the end of a selected input fiber are each located at the focal point of one of the lenses.

5. An optical switch, comprising:
   a bundle of input optical fibers, each having a light output end;
   a bundle of output optical fibers, each having a light input end spaced apart from the light output ends of the input fibers;
   one or more lenses supported in the space between the ends of the input fibers and the ends of the output fibers; and
   a pivot upon which at least the bundle of input optical fibers is mounted for selectively directing the light from the end of one of the input fibers to the end of one of the output fibers.

6. The optical switch of claim 5, including two lenses positioned so that the end of one of the input fibers and the end of one of the output fibers are each located at the focal point of one of the lenses.

7. The optical switch of claim 5, wherein one or both of the input and output bundles are contained in removable connectors.

8. An optical switch, comprising:
   a first removable connector associated with a bundle of input optical fibers, each input fiber having a light output end;
   a second removable connector associated with a bundle of output optical fibers, each output fiber having a light input end spaced apart from the light output ends of the input fibers;
   a first lens associated with collimating the light from the first bundle and a second lens associated with focusing the light onto the ends of the output fibers; and
   means for selectively directing the light from the end of one of the input fibers to the end of one of the output fibers.

9. The optical switch of claim 8, wherein the means for selectively directing the light includes a pivoting bench upon which the first removable connector and first lens are mounted.

10. The optical switch of claim 8, wherein the means for selectively directing the light includes an acousto-optic Bragg cell.

11. An optical switch, comprising:
    an input optical fiber having a light output end;
    a bundle of output optical fibers, each having a light input end spaced apart from the light output end of the input fiber;
    one or more lenses supported in the space between the end of the input fiber and the ends of the output fibers;
    means for selectively directing the light from the end of the input fiber to the end of one of a plurality of the output fibers; and
    wherein one or both of the input fibers and output bundles are contained in removable connectors.

12. The optical switch of claim 11, wherein the means for selectively directing the light includes a pivot upon which at least the input optical fiber is mounted.

13. The optical switch of claim 11, wherein the means for selectively directing the light includes an acousto-optic Bragg cell.

14. The optical switch of claim 11, including two lenses positioned so that the end of the output fiber and the end of a selected input fiber are each located at the focal point of one of the lenses.

15. The optical switch of claim 11, wherein at least one of the output optical fibers is routed to a detector to determine a home position.

16. An optical switch, comprising:
   a bundle of input optical fibers, each having a light output end;
   a bundle of output optical fibers, each having a light input end spaced apart from the light output ends of the input fibers;
   one or more lenses supported in the space between the ends of the input fibers and the ends of the output fibers;
   means for selectively directing the light from the end of one of the input fibers to the end of one of the output fibers;
   wherein one or both of the input and output bundles are contained in removable connectors.

17. The optical switch of claim 16, wherein the means for selectively directing the light includes a pivot upon which at least the bundle of input optical fibers is mounted.

18. The optical switch of claim 16, wherein the means for selectively directing the light includes an acousto-optic Bragg cell.

19. The optical switch of claim 16, including two lenses positioned so that the end of one of the input fibers and the end of one of the output fibers are each located at the focal point of one of the lenses.

20. An optical switch, comprising:
   an input optical fiber having a light output end;
   a bundle of output optical fibers, each having a light input end spaced apart from the light output end of the input fiber;
   one or more lenses supported in the space between the end of the input fiber and the ends of the output fibers; and
   means for selectively directing the light from the end of the input fiber to the end of one of a plurality of the output fibers; and
   wherein at least one of the output optical fibers is routed to a detector to determine a home position.

21. The optical switch of claim 20, wherein the means for selectively directing the light includes a pivot upon which at least the input optical fiber is mounted.

22. The optical switch of claim 20, wherein the means for selectively directing the light includes an acousto-optic Bragg cell.

23. The optical switch of claim 20, including two lenses positioned so that the end of the output fiber and the end of a selected input fiber are each located at the focal point of one of the lenses.

24. The optical switch of claim 20, wherein one or both of the input fibers and output bundles are contained in removable connectors.

25. An optical switch, comprising:
   a bundle of input optical fibers, each having a light output end;
   a bundle of output optical fibers, each having a light input end spaced apart from the light output ends of the input fibers;
   one or more lenses supported in the space between the ends of the input fibers and the ends of the output fibers;
   means for selectively directing the light from the end of one of the input fibers to the end of one of the output fibers;
   wherein at least one of the output optical fibers is routed to a detector to determine a home position.

26. The optical switch of claim 25, wherein the means for selectively directing the light includes a pivot upon which at least the bundle of input optical fibers is mounted.

27. The optical switch of claim 25, wherein the means for selectively directing the light includes an acousto-optic Bragg cell.

28. The optical switch of claim 25, including two lenses positioned so that the end of one of the input fibers and the end of one of the output fibers are each located at the focal point of one of the lenses.

29. The optical switch of claim 25, wherein one or both of the input and output bundles are contained in removable connectors.

\* \* \* \* \*